(12) United States Patent
Miura (10) Patent No.: US 8,569,394 B2
(45) Date of Patent: Oct. 29, 2013

(54) ACTIVE LIGHT-CURABLE INK COMPOSITION, AND INK JET, INK JET PRINTING APPARATUS AND INK JET RECORDING METHOD USING THE LIGHT-CURABLE INK COMPOSITION

(75) Inventor: Satoru Miura, Matsumoto (JP)

(73) Assignee: Seiko Epson Corporation (JP)

(*) Notice: Subject to any disclaimer, the term of this patent is extended or adjusted under 35 U.S.C. 154(b) by 392 days.

(21) Appl. No.: 12/396,553

(22) Filed: Mar. 3, 2009

(65) Prior Publication Data

US 2009/0227733 A1    Sep. 10, 2009

(30) Foreign Application Priority Data

Mar. 4, 2008   (JP) ................................. 2008-053713
Dec. 5, 2008   (JP) ................................. 2008-311175

(51) Int. Cl.
    *C09D 11/10*    (2006.01)
(52) U.S. Cl.
    USPC ............... 522/153; 524/603; 524/556; 522/6; 526/72; 526/301; 526/319; 526/213; 526/224; 526/194; 106/31.13; 427/511; 523/160; 523/161
(58) Field of Classification Search
    USPC ................ 523/160, 161; 106/31.13; 427/511; 522/153, 6; 524/603, 556; 526/72, 301, 526/319, 213, 224, 194
    See application file for complete search history.

(56) References Cited

U.S. PATENT DOCUMENTS

| | | | |
|---|---|---|---|
| 5,623,001 A | 4/1997 | Figov | |
| 2006/0160917 A1 | 7/2006 | Oyanagi et al. | |
| 2006/0187285 A1* | 8/2006 | Oyanagi et al. | 347/100 |
| 2007/0289484 A1 | 12/2007 | Yamaguchi et al. | |
| 2012/0069108 A1 | 3/2012 | Oyanagi et al. | |

FOREIGN PATENT DOCUMENTS

| | | | |
|---|---|---|---|
| JP | 2002-256189 | | 11/2002 |
| JP | 2003-025707 A | | 1/2003 |
| JP | 2004-514014 | * | 5/2004 |
| JP | 2006-152278 A | | 6/2006 |
| JP | 2006-206875 A | | 8/2006 |
| JP | 2006-348201 A | | 12/2006 |
| JP | 2006-348203 A | | 12/2006 |
| JP | 2006-348207 A | | 12/2006 |
| JP | 2007-182535 | | 7/2007 |
| JP | 2008-088254 A | | 4/2008 |
| WO | WO-2002-038688 A2 | | 5/2002 |
| WO | 2006/038457 | | 4/2006 |

OTHER PUBLICATIONS

Photoinitiators for Printing Applications, Key products selection guide, Ciba Specialty Chemicals, 2005.*
Patent Abstracts of Japan of JP 2007-182535 dated Jul. 19, 2007.
Patent Abstracts of Japan of JP 2002-256189 dated Nov. 9, 2002.

* cited by examiner

*Primary Examiner* — Robert C Boyle
(74) *Attorney, Agent, or Firm* — Harness, Dickey & Pierce, P.L.C.

(57) ABSTRACT

An active light-curable ink composition contains a polymerizable compound, a color material having an absorption peak in a wavelength region, and a polymerization initiator having an absorption peak in a different wavelength region from the color material.

15 Claims, 6 Drawing Sheets

WHITE PIGMENT ABSORBANCE/WAVELENGTH SPECTRUM

FIG. 6

IRGACURE 127 SPECTRAL CHARACTERISTIC

ACTIVE LIGHT-CURABLE INK COMPOSITION, AND INK JET, INK JET PRINTING APPARATUS AND INK JET RECORDING METHOD USING THE LIGHT-CURABLE INK COMPOSITION

BACKGROUND

1. Technical Field

The present invention relates to active light-curable ink compositions, and particularly to a light-curable ink composition that can form favorably cured images having high abrasion resistance. The invention also relates to an ink set, an ink jet printing apparatus and an ink jet recording method using the active light-curable ink composition.

2. Related Art

In the ink jet recording method, an ink composition is deposited on a print medium, such as a paper sheet, by ejecting droplets of the ink composition, thereby performing printing. The ink jet recording method can print high-resolution and high-quality images at high speed. In general, the ink composition used in the ink jet recording method is essentially composed of an aqueous solvent, and contains a coloring material and a wetting agent, such as glycerol, for preventing clogging.

If aqueous ink repellent paper or cloth or aqueous ink repellent metal or plastic is used as the print medium, more specifically, if an ink composition is printed on a print medium, such as a plate or film made of, for example, phenol, melamine, vinyl chloride, acrylic resin or polycarbonate, the ink composition is required to contain a component capable of stably fixing the color material to the print medium.

According to this requirement, for example, U.S. Pat. No. 5,623,001 discloses a light-curable ink jet ink containing a color material, a photo-curing agent (radically polymerizable compound), and a (photo-radical) polymerization initiator. It is believed that this ink does not spread into print media and can enhance the quality of printed images.

The polymerization initiator is required to sufficiently adsorb light having the wavelength of the light source from the viewpoint of enhancing the image quality. For example, Japanese Unexamined Patent Application Publication No. 2007-182535 discloses photo-curable cyan, magenta, yellow and black ink compositions containing the same polymerization initiator irrespective of the color materials.

However, it has been found that ink compositions containing the same polymerization initiator as the composition disclosed in the above patent document cannot form sufficiently cured images having high abrasion resistance, depending on the color in some cases when being cured by active light. The color materials absorb different lights having different wavelengths, and the curing may be affected by light absorption of some of the color materials. The curability and abrasion resistance are degraded particularly in yellow, magenta and cyan images.

SUMMARY

An advantage of some aspects of the invention is that it provides an active light-curable ink composition that can form sufficiently cured images having high abrasion resistance.

Another advantage is that it provides an ink set, an ink jet printing apparatus and an ink jet recording method using the active light-curable ink composition.

According to an aspect of the invention, an active light-curable ink composition is provided which contains a polymerizable compound, a color material having an absorption peak in a wavelength region, and a polymerization initiator having an absorption peak in a different wavelength region from the color material.

In the active light-curable ink composition, the color material may be a yellow color material having an absorption peak in a wavelength region of 370 to 390 nm. In this instance, when the absorbance of the absorption peak of the yellow color material is defined to be 1, the absorption peak of the polymerization initiator lies in a wavelength region where the yellow color material exhibits an absorbance of 0.6 or less.

Also, the color material may be a magenta color material having an absorption peak in a wavelength region of 550 to 570 nm. In this instance, when the absorbance of the absorption peak of the magenta color material is defined to be 1, the absorption peak of the polymerization initiator lies in a wavelength region where the magenta color material exhibits an absorbance of 0.5 or less.

The color material may be a cyan color material having an absorption peak in a wavelength region of 330 to 350 nm. In this instance, when the absorbance of the absorption peak of the cyan color material is defined to be 1, the absorption peak of the polymerization initiator lies in a wavelength region where the cyan color material exhibits an absorbance of 0.6 or less.

If the yellow color material is used, the polymerization initiator preferably has an absorption peak in the wavelength region of 275 to 350 nm.

If the magenta color material is used, the polymerization initiator preferably has an absorption peak in the wavelength region of 350 to 450 nm.

If the cyan color material is used, the polymerization initiator preferably has an absorption peak in the wavelength region of 275 to 300 nm.

According to another aspect of the invention, an ink set is provided which includes active light-curable inks for a plurality of colors. Each active light-curable ink contains an active light-curable ink composition containing a polymerizable compound, a color material having an absorption peak in a wavelength region, and a polymerization initiator having an absorption peak in a different wavelength region from the color material. At least one of the active light-curable ink compositions is selected from among the above-described active light-curable yellow, magenta and cyan ink compositions.

The ink set may further include an active light-curable white ink composition containing a polymerizable compound, a white color material having an absorption peak in a wavelength region, and a polymerization initiator having an absorption peak in the wavelength region of the absorption peak of the white color material.

Preferably, the polymerization initiator has an absorption peak in the wavelength region where the white color material exhibits an absorbance higher than the absorbance in the UV-visible region of 300 to 350 nm.

Preferably, the polymerization initiator in the active light-curable white ink composition has an absorption peak in the wavelength region of 350 to 450 nm.

The ink set may further include an active light-curable clear ink composition containing at least one polymerizable compound and a polymerization initiator, but not containing a color material. The polymerization initiator of the clear ink composition has an absorption peak in a wavelength region different from the wavelength region where the highest absorption peak of the polymerizable compounds of the active light-curable clear ink composition lies.

According to another aspect of the invention, an ink jet printing apparatus is provided which includes the above-described active light-curable ink composition.

Furthermore, an ink jet printing apparatus is provided which includes using the above-described active light-curable ink composition.

In the active light-curable ink composition, particularly in the active light-curable ink composition containing a chromatic color material, such as a yellow color material, a magenta color material, or a cyan color material, the polymerization initiator has an absorption peak in a wavelength region different form the wavelength region of the absorption peak of the color material. Hence, the polymerization initiator is selected according to the color of the color material. Therefore, the ink composition is not affected by the light absorption of the color material when being cured by active light. Consequently, the ink composition can form sufficiently cured images having high abrasion resistance.

In the known printing, inks having high curability are ejected early and inks having low curability follow. In use of the ink set including inks for a plurality of colors, each containing an active light-curable ink composition according to an aspect of the invention, however, the inks can be ejected in an arbitrary order irrespective of the curability. In addition, the spreading of inks at overlaps of the colors resulting from the difference of curing reactions can be reduced.

The ink set may further include an active light-curable white ink composition containing a white color material or an active light-curable clear ink composition not containing a color material, in addition to the active light-curable ink composition containing chromatic color materials.

In general, the white color material contained in a white ink composition reflects (scatters) any light. Accordingly, white ink cannot be sufficiently cured because the white color material reflects light from a light source and the light cannot reach the polymerization initiator. Accordingly, the white ink composition of the ink set uses a polymerization initiator having an absorption peak in a region of wavelengths at which the reflection from the white color material is small, that is, in a wavelength region where the white color material has an absorption peak, exhibiting a high apparent absorbance. Thus, the light from the light source can reach the inside of the ink coating to be cured, and the resulting image can sufficiently be cured and exhibit superior abrasion resistance.

Preferably, the clear ink composition of the ink set contains a polymerization initiator having an absorption peak in a wavelength region different from the wavelength region where the polymerizable compounds of the clear ink composition exhibit the highest absorption peak. Such a clear ink composition can form sufficiently cured images having high abrasion resistance without being affected by the light absorption of the polymerizable compounds.

BRIEF DESCRIPTION OF THE DRAWINGS

The invention will be described with reference to the accompanying drawings, wherein like numbers reference like elements.

DESCRIPTION OF EXEMPLARY EMBODIMENTS

An active light-curable ink composition according to an embodiment of the invention will now be described.

An active light-curable ink composition of an embodiment of the invention contains a polymerizable compound, a color material, and a polymerization initiator.

Preferably, the polymerizable compound is a dendritic polymer. Dendritic polymers are generally classified into the following six types (refer to "Dendritic Koubunshi—Tabunnki Kouzou ga Hirogeru Koukinouka no sekai (Dendritic Polymer—Highly Functional World Provided by Multi-branched Structures)", Edited by K. AOKI and M. KAKIMOTO, published by NTS Inc.):

I: dendrimers;
II: linear-dendritic polymers;
III: dendrigraft polymers;
IV: hyperbranched polymers;
V: star hyperbranched polymers; and
VI: hypergraft polymers.

While dendritic polymers I to III have degrees of branching (DB) of 1 and no defects, dendritic polymers IV to VI have randomly branched structures that may include defects. In particular, dendrimers allow their reactive functional groups to be disposed in a dense and concentrated state at the outermost surface in comparison with common linear polymers, and are expected as functional polymer materials. Hyperbranched polymers, dendrigraft polymers and hypergraft polymers also allow, but not more than dendrimers, many reactive functional groups to be introduced to the outermost surface, and are superior in curability.

Unlike conventionally used linear or branched polymers, these dendritic polymers are highly branched by repeating three-dimensionally branched structures. Accordingly, dendritic polymers can have lower viscosities than linear polymers having the same molecular weight.

The dendrimer used in the embodiment of the invention can be synthesized by a divergent method that synthesizes a polymer outward from the center or by a convergent method that synthesizes a polymer inward from the outside.

In the embodiment of the invention, dendrimers, hyperbranched polymers, dendrigraft polymers and hypergraft polymers used as the dendritic polymer are solid at room temperature and have number average molecular weights in the range of 1,000 to 100,000, more preferably in the range of 2,000 to 50,000. If the dendritic polymer is not solid at room temperature, the resulting image is difficult to maintain. If the molecular weight is lower than the above range, fixed images are brittle. If the molecular weight is higher than the above range, the ink containing such a dendritic polymer has an excessively high viscosity even if the dendritic polymer content is reduced and is thus impracticable in view of ejection.

Preferably, the dendrimer, hyperbranched polymer, dendrigraft polymer and hypergraft polymer used in the embodiment of the invention have radically polymerizable functional groups at the outermost surfaces. Such a structure promotes polymerization.

Examples of polymers having dendrimer structures include amide amine dendrimers (U.S. Pat. Nos. 4,507,466, 4,558,120, 4,568,737, 4,587,329, 4,631,337, and 4,694,064) and phenyl ether dendrimers (U.S. Pat. No. 5,041,516 and Journal of American Chemistry Vol. 112 (1990, pp. 7638-7647)). An amide amine dendrimer named "Starburst™ (PAMAM)" having a terminal amino group and a methyl carboxylate group is commercially available from Aldrich. The terminal amino group of the amide amine dendrimer may be allowed to react with acrylic acid derivatives or methacrylic acid derivatives to synthesize amide amine dendrimers having terminals of acrylic or methacrylic acid derivatives.

Exemplary acrylic or methacrylic derivatives include, but not limited to, alkyl acrylates or methacrylates, such as methyl(meth)acrylate, ethyl(meth)acrylate, n-butyl(meth)acrylate, t-butyl(meth)acrylate, cyclohexyl(meth)acrylate, palmityl(meth)acrylate, and stearyl(meth)acrylate; and amide acrylates; and alkylamide acrylates or methacrylates, such as isopropylamide(meth)acrylate.

The above cited document, Journal of American Chemistry Vol. 112 (1990, pp. 7638-7647), describes many phenyl ether dendrimers. According to the document, for example, 3,5-dihydroxybenzyl alcohol is allowed to react with 3,5-diphenoxybenzyl bromide to synthesize a second generation benzyl alcohol. The OH group of the benzyl alcohol is replaced with Br using $CBr_4$ and triphenylphosphine, and then the product is allowed to react with 3,5-dihydroxybenzyl alcohol to synthesize a next generation benzyl alcohol. The same reaction is repeated to synthesize a desired dendrimer. The terminal benzyl ether bonds of phenyl ether dendrimers can also be replaced with various chemical structures. For example, in the synthesis of a dendrimer described in the above-cited document, Journal of American Chemistry Vol. 12, an alkyl halide is used as an alternative to benzyl bromide to produce a phenyl ether dendrimer having a terminal structure including the corresponding alkyl group. Polyamine dendrimers (Macromol. Symp. 77, 21 (1994)) and their derivatives whose terminal groups have been modified can also be used.

Hyperbranched polyethylene glycols can be used as the hyperbranched polymer. The hyperbranched polymer is produced by synthesizing a target polymer in a single step using a monomer having at least two reaction points of the same type acting as branch points and only one reaction point of another type acting as a binding point (Macromolecules, vol. 29 (1996), pp. 3831-383). The monomer for synthesizing such a hyperbranched polymer may be, for example, 3,5-dihydroxybenzoic acid derivatives. The hyperbranched polymer can be produced by, for example, heating methyl 3,5-bis((8'-hydroxy-3',6'-dioxaoctyl)oxy)benzoate, which is a hydrolysate of methyl 3,5-bis((8'-(t-butyldiphenylsiloxy)-3',6'-dioxaoctyl)oxy)benzoate produced from 1-bromo-8-(t-butyldiphenylsiloxy)-3,6-dioxaoctane and methyl 3,5-dihydroxybenzoate, with dibutyltin diacetate in a nitrogen atmosphere. Thus, a hyperbranched polymer, poly[bis(triethylene glycol)benzoate], is synthesized.

In use of 3,5-dihydroxy benzoic acid, the terminal group of the hyperbranched polymer is the hydroxy group. By allowing appropriate alkyl halides to act on the hydroxy group, hyperbranched polymers having a variety of terminal groups can be synthesized.

The characteristics of monodisperse polymers having dendrimer structures and hyperbranched polymers depend on the chemical structures of the main chain and its terminal group, and are particularly varied depending on the terminal group and the substituents in the chemical structure. In particular, a structure having a polymerizable group at the end is reactive and accordingly exhibits high effect of gelation after optical reaction. A dendrimer having a polymerizable group can be produced by chemically modifying the end of a structure having a basic atomic group, such as amino, substituted amino, or hydroxyl, at the end with a compound having a polymerizable group.

For example, a polyfunctional compound produced by Michael addition of an active hydrogen-containing (meth)acrylate compound to an amino dendrimer is subjected to addition reaction with, for example, an isocyanate group-containing vinyl compound. An amino dendrimer may be allowed to react with (meth)acryloyl chloride or the like. Thus, a dendrimer having a polymerizable group at the end can be produced. An example of the vinyl compound giving such a polymerizable group has a radically polymerizable ethylenic unsaturated bond. Examples of the polymerizable group having a radically polymerizable ethylenic unsaturated bond include unsaturated carboxylic acids, such as acrylic acid, methacrylic acid, itaconic acid, crotonic acid, isocrotonic acid, and maleic acid, and salts of these acids.

The dendrimers, hyperbranched polymers, dendrigraft polymers and hypergraft polymers may be used singly or in combination with a different type of dendrimer or hyperbranched polymer.

The dendritic polymer content in the active light-curable ink composition is preferably 3% to 30% by mass from the viewpoint of maintaining the suitability as an active light-curable ink. More preferably, the dendritic polymer content is in the range of 5% to 25% by mass.

If the dendritic polymer content is less than 3% by mass, the resulting active light-curable ink composition may not sufficiently be cured. If the dendritic polymer content is more than 30% by weight, the resulting ink composition may have a problem with viscosity, dispersion stability, or storage stability.

The active light-curable ink composition contains a dendritic polymer, and preferably contains a diluting monomer such as an allyl glycol and/or N-vinylformamide and a photo-radical polymerization initiator.

The allyl glycol and/or N-vinylformamide are a monofunctional radically polymerizable monomer, and have a low risk of reacting with the photo-radical polymerization initiator to produce an undesired polymer during storage.

If the content of the allyl glycol and/or N-vinylformamide is less than 20% by mass, the resulting ink composition produces a problem with viscosity, dispersion stability, or storage stability. If its content is more than 80% by mass, the resulting active light-curable ink composition may not sufficiently be cured. More preferably, the content of the allyl glycol and/or N-vinylformamide is in the range of about 20% to 70% by mass.

The active light-curable ink composition may further contain other photo-radically polymerizable compound in addition to the allyl glycol.

Such a photo-radically polymerizable compound is, but not particularly limited to, a monomer.

The monomer refers to a molecule that can be a structural unit of the principle structure of a polymer. The monomer used in the embodiment of the invention may be a monofunctional monomer, a bifunctional monomer, or a polyfunctional monomer. From the viewpoint of safety, the monomer preferably has a PII (primary irritation index) of 2 or less irrespective of the type of monomers.

Table 1 shows examples of usable monofunctional, bifunctional, and polyfunctional monomers having a PII value of 2 or less.

The active light-curable ink composition contains a color material.

The color material may be a dye or a pigment, and pigments are advantageous from the viewpoint of enhancing the durability of printed matter.

If a dye is used, it may be selected from various types of dye generally used for ink jet recording, such as direct dyes, acid dyes, food dyes, basic dyes, reactive dyes, disperse dyes, vat dyes, soluble vat dyes, and reactive disperse dyes.

If a pigment is used, it may be an inorganic pigment or an organic pigment without particular limitation.

Exemplary inorganic pigments include titanium oxide, iron oxide, and carbon black produced by known methods, such as the contact method, the furnace method, and the thermal method. Exemplary organic pigments include azo pigments, such as azo lake, insoluble azo pigments, condensed azo pigments, and chelate azo pigments; polycyclic pigments, such as phthalocyanine pigments, perylene pig-

TABLE 1

| Compound | Viscosity (mPa · s) | PII |
|---|---|---|
| Monofunctional monomer | | |
| (2-methyl-2-ethyl-1,3-dioxolane-4-yl)methacrylate (MEDOL-10, Osaka Organic Chemical Industry) | 5.1 | 1.3 |
| (2-methyl-2-isobutyl-1,3-dioxolane-4-yl)methacrylate (MIBDOL-10, Osaka Organic Chemical Industry) | 5.3 | 1.0 |
| Phenoxyethyl acrylate (Biscoat #192, Osaka Organic Chemical Industry) | 3.3 | 1.7 |
| Isobornyl acrylate (IBXA, Osaka Organic Chemical Industry) | 2.6 | 0.6 |
| Methoxy diethylene glycol monoacrylate (Blemmer PME-100, NOF Corporation) | 2 | 0.7 |
| Acryloyl morpholine (ACMO, Kohjin) | 12 | 0.5 |
| Bifunctional monomer | | |
| Ethylene glycol dimethacrylate (Light Ester EG, Kyoei-sha Kagaku) | 3 | 0.6 |
| Diethylene glycol dimethacrylate (Light Ester 2EG, Kyoei-sha Kagaku) | 5 | 0.5 |
| Tripropylene glycol diacrylate (Alonix M-220, Toagousei) | 12 | 1.6 |
| 1,9-nonanediol diacrylate (Biscoat #260, Osaka Organic Chemical Industry) | 21 | 2.0 |
| Polyethylene glycol #400 diacrylate (NK Ester A400, Shin-Nakamura Chemical) | 58 | 0.4 |
| Tetraethylene glycol dimethacrylate (NK Ester 4G, Shin-Nakamura Chemical) | 14 | 0.5 |
| 1,6-hexanediol methacrylate (NK Ester HD-N, Shin-Nakamura Chemical) | 6 | 0.5 |
| Neopentyl glycol dimethacrylate (NK Ester NPG, Shin-Nakamura Chemical) | 7 | 0.0 |
| 2-Hydroxy-1,3-dimethacryloxypropane (NK Ester 701, Shin-Nakamura Chemical) | 37 | 0.6 |
| Polyfunctional monomer | | |
| Trimethylolpropane trimethacrylate (NK Ester TMPT, Shin-Nakamura Chemical) | 42 | 0.8 |
| Trimethylolpropane-modified triacrylate (Biscoat #360, Osaka Organic Chemical Industry) | 55 | 1.5 |
| Trimethylolpropane PO-modified triacrylate (NEW FRONTIER TMP-3P, Dai-ichi Kogyo Seiyaku) | 60 | 0.1 |
| Glycerin PO-modified triacrylate (Biscoat #GPT, Osaka Organic Chemical Industry) | 75 | 0.8 |

The viscosities shown in Table 1 are values obtained by measurements at 25° C.

In addition to the above-described monomer, the active light-curable ink composition may contain an oligomer as a photo-radically polymerizable compound.

The active light-curable ink composition may further contain a surfactant, such as silicones surfactant. Preferred silicone surfactants include polyester-modified silicones and polyether-modified silicones. More specifically, polyether-modified polydimethyl siloxane and polyester-modified polydimethyl siloxane are preferred. For example, BYK-347, BYK-348, and BYK-UV3500, 3510, 3530 and 3570 are available from BYK.

ments, perinone pigments, anthraquinone pigments, quinacridone pigments, dioxazine pigments, thioindigo pigments, isoindolinone pigments, and quinofuralone pigments; dye chelates, such as basic dye chelates and acid dye chelates; nitro pigments; nitroso pigments; and aniline black.

Examples of carbon black include C. I. Pigment Black 7; No. 2300, No. 900, MCF88, No. 33, No. 40, No. 45, No. 52, MA7, MA8, MA100, and No. 2200B produced by Mitsubishi Chemical; Raven 5750, Raven 5250, Raven 5000, Raven 3500, Raven 1255, and Raven 700 produced by Columbia; Regal 400R, Regal 330R, Regal 660R, Mogul L, Mogul 700, Monarch 800, Monarch 880, Monarch 900, Monarch 1000, Monarch 1100, Monarch 1300, and Monarch 1400 produced by Cabot; and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 produced by Degussa.

Pigments used for yellow ink include C. I. Pigment Yellows 1, 2, 3, 12, 13, 14, 16, 17, 73, 74, 75, 83, 93, 95, 97, 98, 109, 110, 114, 120, 128, 129, 138, 150, 151, 154, 155, 180, 185, and 213.

Pigments used for magenta ink include C. I. Pigment Reds 5, 7, 12, 48(Ca), 48(Mn), 57(Ca), 57:1, 112, 122, 123, 168, 184, 202, and 209 and C. I. Pigment Violet 19.

Pigments used for cyan ink include C. I. Pigment Blues 1, 2, 3, 15:3, 15:4, 60, 16, and 22.

In the embodiment, preferably, the pigment has an average particle size in the range of 10 to 200 nm, and more preferably in the range of about 50 to 150 nm.

In particular, when the active light-curable ink composition contains a chromatic color material, such as for yellow, magenta, or cyan, the curability and the abrasion resistance can be enhanced.

The content of the color material (preferably pigment) is preferably 2 to 10 parts by mass for yellow ink and magenta ink and 1 to 8 parts by mass for cyan ink, relative to 100 parts by mass of the active light-curable ink composition.

Preferably, the pigment is dispersed in an aqueous medium with a dispersant or a surfactant, and the resulting pigment dispersion is used for the ink composition. Dispersants conventionally used for preparing pigment dispersions, such as polymer dispersants, can be used for the pigment dispersion.

The active light-curable ink composition of the embodiment further contains a polymerization initiator having an absorption peak in a different wavelength region form the region where the color material has an absorption peak. The absorption peak wavelength region mentioned herein includes the wavelength at which the absorption peak is shown and its vicinities.

If the absorption peak wavelengths of the color material and the polymerization initiator are close, the color material absorbs light having the absorption wavelength, and accordingly reduces the light irradiating the polymerization initiator when the ink composition is cured with active light. Consequently, the printed ink cannot be sufficiently cured, and the abrasion resistance of the printed ink is degraded. Since different color materials have different absorption wavelengths, appropriate polymerization initiators should be selected for respective colors. However, if the polymerization initiator has a wavelength of more than 450 nm, the ink composition may be cured undesirably by visible light during storage. Accordingly, the absorption wavelength of the polymerization initiator is preferably 450 nm or less.

Figure 1:
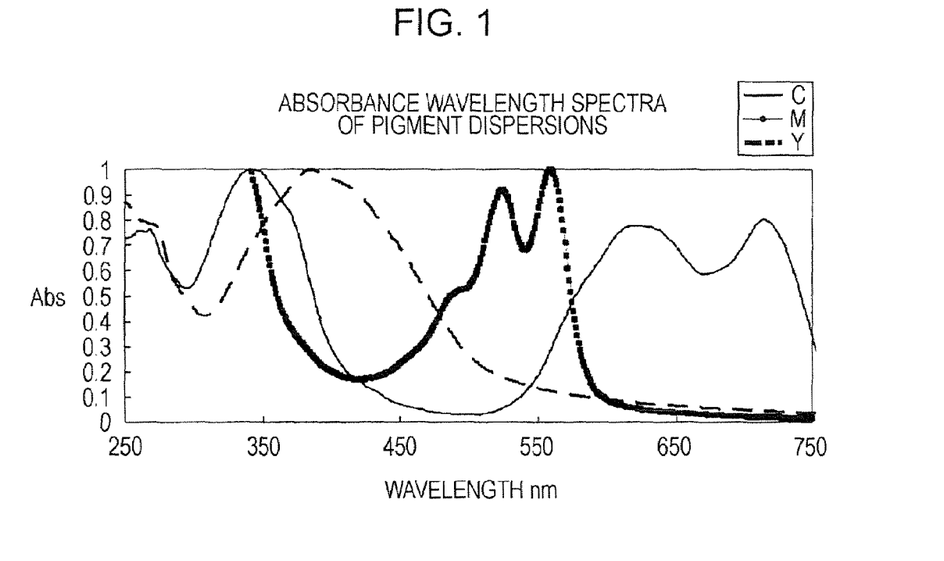
FIG. 1 is UV-visible light absorption spectra of solutions in allyl glycol of yellow, magenta and cyan color pigments generally used in active light-curable ink compositions.

FIG. 1 is UV-visible light absorption spectra of solutions in allyl glycol of yellow, magenta and cyan color pigments generally used in active light-curable ink compositions.

Figure 2:
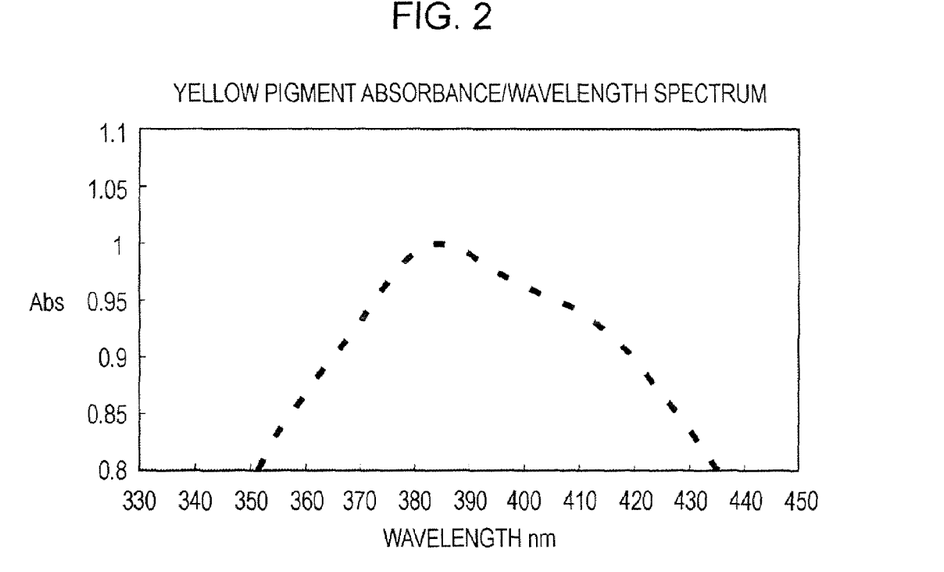
FIG. 2 is a fragmentary enlarged representation of the UV-visible light absorption spectrum of the yellow pigment solution in allyl glycol shown in FIG. 1.
Figure 3:
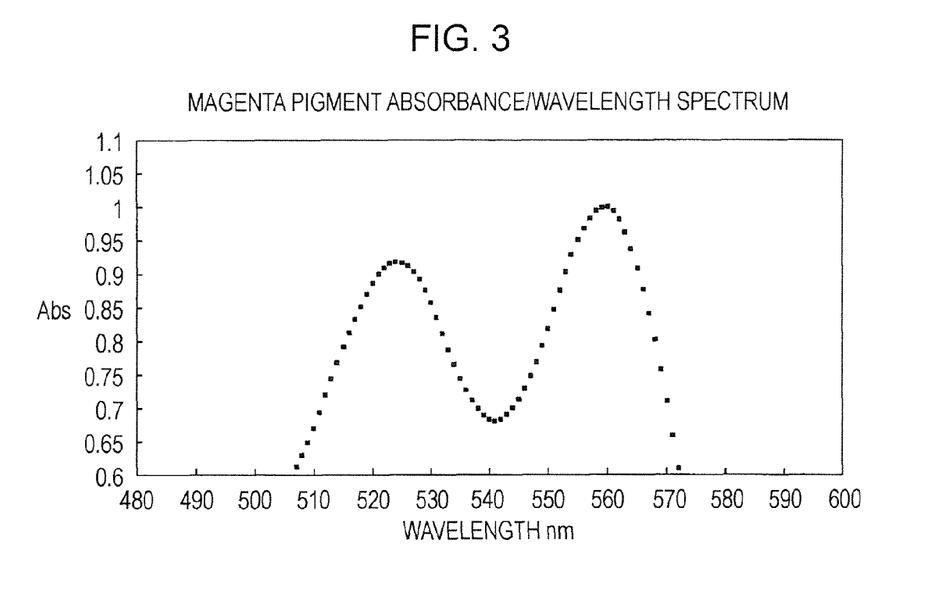
FIG. 3 is a fragmentary enlarged representation of the UV-visible light absorption spectrum of the magenta pigment solution in allyl glycol shown in FIG. 1.
Figure 4:
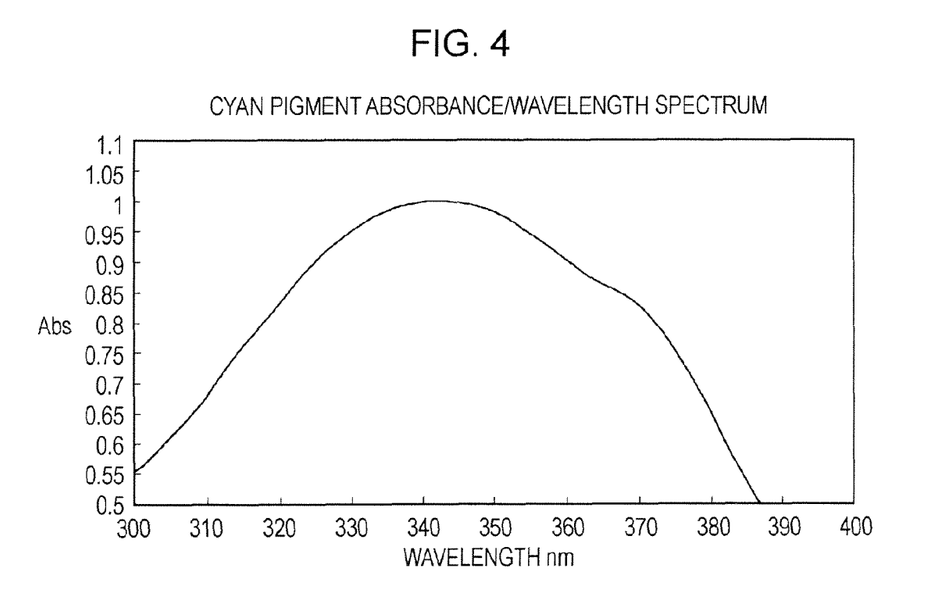
FIG. 4 is a fragmentary enlarged representation of the UV-visible light absorption spectrum of the cyan pigment solution in allyl glycol shown in FIG. 1.

FIGS. 2 to 4 are fragmentary enlarged representations of the UV-visible light absorption spectra of the yellow, magenta and cyan pigment solutions in allyl glycol shown in FIG. 1, respectively.

For a yellow color material, as shown in FIGS. 1 and 2, it is preferable that the polymerization initiator have an absorption peak in a wavelength region where the yellow color material has an absorbance of 0.6 or less with respect to the absorbance (=1) of the absorption peak in the UV-visible region of 370 to 390 nm. More preferably, the absorbance of the yellow color material in the absorption peak wavelength region of the polymerization initiator is 0.45 or less, and still more preferably 0.4 or less.

The polymerization initiator for the yellow color material particularly preferably has an absorption peak in the range of 275 to 350 nm.

Such a polymerization initiator can be a photo-radical polymerization initiator, such as benzophenone, isoamino-P-dimethylaminobenzoate ester, α-hydroxyalkylphenone, α-aminoalkylphenone, oxime ester, aminobenzoate, α-dicarbonyl, or anthraquinone.

The photo-radical polymerization initiator for yellow color material is available as, for example, the following trade names: Vicures 10 and 30 (produced by Stauffer Chemical); Irgacures 184, 500, 651, 2959, 907, 369, 379, 754, and 1700, OXE 01, Darocur 1173, TPO, and ITX (produced by CIBA Specialty Chemicals); Quantacure CTX (produced by Aceto Chemical); and Kayacure BMS (produced by Nippon Kayaku).

For a magenta color material, as shown in FIGS. 1 and 3, it is preferable that the polymerization initiator have an absorption peak in a wavelength region where the magenta color material has an absorbance of 0.5 or less with respect to the absorbance (=1) of the absorption peak in the UV-visible region of 550 to 570 nm. More preferably, the absorbance of the magenta color material in the absorption peak wavelength region of the polymerization initiator is 0.4 or less, and still more preferably 0.3 or less.

The polymerization initiator for the magenta color material particularly preferably has an absorption peak in the range of 350 to 450 nm.

Such a polymerization initiator can be a photo-radical polymerization initiator, such as acylphosphine oxide or thioxanthone.

The photo-radical polymerization initiator for magenta color material is available as, for example, the following trade names: Irgacures 819, 819DW, 784, and 4265 and TPO (produced by CIBA Specialty Chemicals); Quantacure CTX (produced by Aceto Chemical); and Kayacure CTX (produced by produced by Nippon Kayaku).

For a cyan color material, as shown in FIGS. 1 and 4, it is preferable that the polymerization initiator have an absorption peak in a wavelength region where the cyan color material has an absorbance of 0.6 or less with respect to the absorbance (=1) of the absorption peak in the UV-visible region of 330 to 350 nm. More preferably, the absorbance of the cyan color material in the absorption peak wavelength region of the polymerization initiator is 0.55 or less, and still more preferably 0.5 or less.

The polymerization initiator for the cyan color material particularly preferably has an absorption peak in the range of 275 to 300 nm.

Such a polymerization initiator can be a photo-radical polymerization initiator, such as α-hydroxyalkylphenone, α-aminoalkylphenone, α-dicarbonyl, or anthraquinone.

The photo-radical polymerization initiator for cyan color material is available as, for example, the following trade names: Irgacures 127, 2959, and 1800 (produced by CIBA Specialty Chemicals); Quantacure CTX (produced by Aceto Chemical); and ESACURE KIP150 (produced by Lamberti).

The polymerization initiator content is preferably 3.0 parts by mass or more relative to 100 parts by mass of the active light-curable ink composition, within a range not causing precipitation. More preferably, the polymerization initiator content is 3.5 to 5.5 parts by mass.

The active light-curable ink composition may contain a polymerization promoter. Examples of the polymerization promoter include, but not limited to, Darocur EHA and Darocur EDB (produced by CIBA Specialty Chemicals).

Preferably, the active light-curable ink composition contains a thermal radical polymerization inhibitor. The thermal radical polymerization inhibitor enhances the storage stability of the ink composition. For example, Irgastab UV-10 (produced by CIBA Specialty Chemicals) can be used as the thermal radical polymerization inhibitor.

The active light-curable ink composition may further contain other known additives, such as a wetting agent, penetrating solvent, a pH adjuster, a preservative, and a fungicide.

Furthermore, the active light-curable ink composition may contain a leveling agent, a matte agent, and an additive for adjusting the film properties, such as polyester resin, polyurethane resin, vinyl resin, acrylic resin, rubber resin, or wax.

In use of the active light-curable ink composition for ink jet recording, the ink composition preferably has a viscosity of 10 mPa·s or less at 25° C.

An active light-curable ink set according to an embodiment of the invention includes active light-curable inks for a plurality of colors, each containing an active light-curable ink composition according to an embodiment of the invention.

If an ink composition of the ink set contains a color material, a plurality of ink compositions may be prepared for the color. If dark and light colors are used in addition to each of the four fundamental colors: yellow, magenta, cyan, and black, for example, light magenta and deep red may be used in addition to magenta; light cyan and dark blue may be used in addition to cyan; gray, light black and dark matte black may be used in addition to black.

The ink set may further include an active light-curable ink composition containing a white color material (white ink composition) or an active light-curable ink composition not containing a color material (clear ink composition).

In general, the white color material contained in a white ink composition reflects (scatters) light having wavelengths in the visible region and its vicinity. Accordingly, white ink cannot be sufficiently cured because the white color material reflects light from a light source and the light cannot reach the polymerization initiator. Accordingly, the white ink composition of the ink set contains a polymerization initiator having an absorption peak in a wavelength region where the reflection from the white color material is small, that is, in a wavelength region where the white color material has an absorption peak, exhibiting a high apparent absorbance. Thus, the light from the light source can reach the inside of the ink coating to be cured, and the resulting image can sufficiently be cured and exhibit high abrasion resistance.

The apparent absorbance can be measured with a spectrophotometer (for example, U-3300 manufactured by Hitachi).

Exemplary white color materials include titanium oxide, sulfates, zinc sulfide, barium carbonate, antimony oxide, zirconium oxide, calcium carbonate, barium sulfate, alumina, silica, calcium silicate, zinc phosphate, and aluminum powder. Preferably, titanium oxide, which has a high L* value (lightness), is used from the viewpoint of whiteness.

Figure 5:
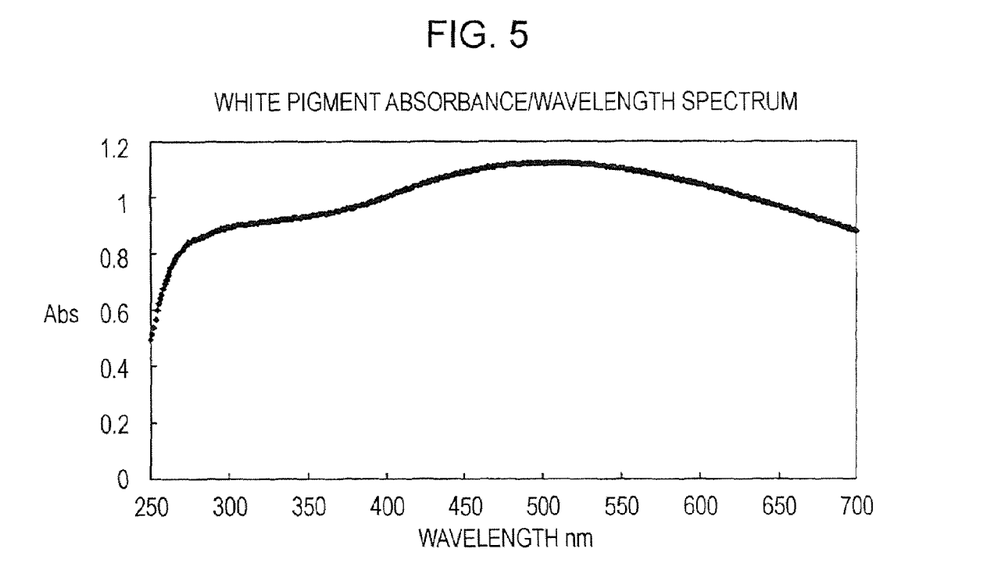
FIG. 5 is a UV-visible light absorption spectrum of a solution in allyl glycol of a white pigment (titanium oxide) generally used in active light-curable ink compositions.

FIG. 5 is a UV-visible light absorption spectrum of a solution in allyl glycol of titanium oxide, which is generally used as a white pigment in active light-curable ink compositions.

Let the absorbance of a white color material in the UV-visible region of 300 to 350 nm be 0.9. The white color material preferably has an absorption peak in the wavelength range where the white color material exhibits an absorbance higher than 0.9, as shown in FIG. 5.

Such a polymerization initiator particularly preferably has an absorption peak in the range of 350 to 450 nm.

The polymerization initiator for white color material can be a photo-radical polymerization initiator, such as acylphosphine oxide or thioxanthone.

The photo-radical polymerization initiator for white color material is available as, for example, the following trade names: Irgacures 819, 819DW, 784, 4265 and TPO (produced by CIBA Specialty Chemicals); Quantacure CTX (produced by Aceto Chemical); and Kayacure CTX (produced by Nippon Kayaku).

The clear ink composition of the ink set contains a polymerization initiator having an absorption peak in a wavelength region different from the wavelength region where the highest absorption peak of the polymerizable compounds of the clear ink composition lies. The highest absorption peak of the polymerizable compounds refers to the highest absorption peak in the UV-visible region of a solution containing all the polymerizable compounds of the clear ink composition in a solvent (or a polymerizable compound solution in a solvent-based polymerizable compound, if the clear ink composition mainly contains a solvent, such as allyl glycol). Such a clear ink composition can form sufficiently cured images having high abrasion resistance without being affected by the light absorption of the polymerizable compounds.

In the white ink composition and clear ink composition, the constituents other than the color material, such as polymerizable compounds, may be the same as those of the active light-curable ink compositions including the yellow, magenta, and cyan color materials.

The active light-curable ink or ink set can be used in an ink jet recording method in which the ink composition is ejected onto a print medium and subsequently irradiated with active light, such as ultraviolet light.

The active light may be ultraviolet light, near-ultraviolet light, or natural light (may be filtered), and is preferably ultraviolet light. The light source is not particularly limited, but preferably emits light having a wavelength in the range of 350 to 450 nm.

When UV light is used as the active light, the exposure dose is set in the range of 10 to 20,000 mJ/cm$^2$, and preferably in the range of 50 to 15,000 mJ/cm$^2$. Such exposure ensures a sufficient curing reaction.

The UV exposure light can be emitted from an ultraviolet light LED, a metal halide lamp, a xenon lamp, a carbon arc lamp, a chemical lamp, a low-pressure mercury lamp, a high-pressure mercury, and so forth. For example, H Lamp, D Lamp, and V Lamp are commercially available from Fusion System.

Alternatively, a UV light emitting semiconductor element, such as a UV light emitting laser, may be used for UV exposure.

The active light-curable ink can be printed by an ink jet printer.

EXAMPLES

The invention will be further described with reference to Examples. However, it is not limited to the Examples.

Examples 1 to 6, Comparative Examples 1 to 3

(Preparation of Active Light-Curable Ink Composition)

Allyl glycol was used as the polymerizable compound, and Biscoat #1000 produced by Osaka Organic Chemical Industry was used as the radically polymerizable compound (hyperbranched polymer). Biscoat #1000 is a hyperbranched polymer formed by extending functional groups from the core, dipentaerythritol. Biscoat #1000 further contains ethylene glycol diacrylate as a diluting monomer and has a viscosity of 273 mPa·s and 14 functional groups (acrylic groups). Biscoat #1000 has an acryloyl group at the outermost layer and can be suitably used.

While dendrimers are prepared through many process steps because of their high stereoregularity and result in increased cost, hyperbranched polymers can be synthesized relatively easily because of their low stereoregularity and are accordingly advantageous in cost.

Pigment dispersions were prepared according to the following procedure.

To 15 parts by mass of C. I. Pigment Yellow 155 (coloring agent) and 3.5 parts by mass of Discole N-509 (dispersant, produced by Dainichiseika Color & Chemicals Mfg), allyl glycol (monomer, produced by Nippon Nyukazai) was added to 100 parts by mass in total and agitated to prepared a mixture. The mixture was sufficiently blended for 6 hours in a sand mill (produced by Yasukawa Seisakusho) with zirconia beads (diameter: 1.5 mm).

The zirconia beads were removed with a separator to yield a yellow pigment dispersion.

Other color pigment dispersions, cyan pigment dispersion (C. I. Pigment Blue 15:3) and magenta pigment dispersion (C. I. Pigment Violet-19), were prepared in the same manner as above.

Active light-curable ink compositions of Examples 1 to 6 and Comparative Examples 1 to 3 were each prepared by mixing a polymerization initiator, a polymerization modifier, and a thermal radical polymerization inhibitor with the above-described allyl glycol, hyperbranched polymer, and pigment dispersion, according to the compositions (percent by mass) shown in Table 2.

Figure 6:
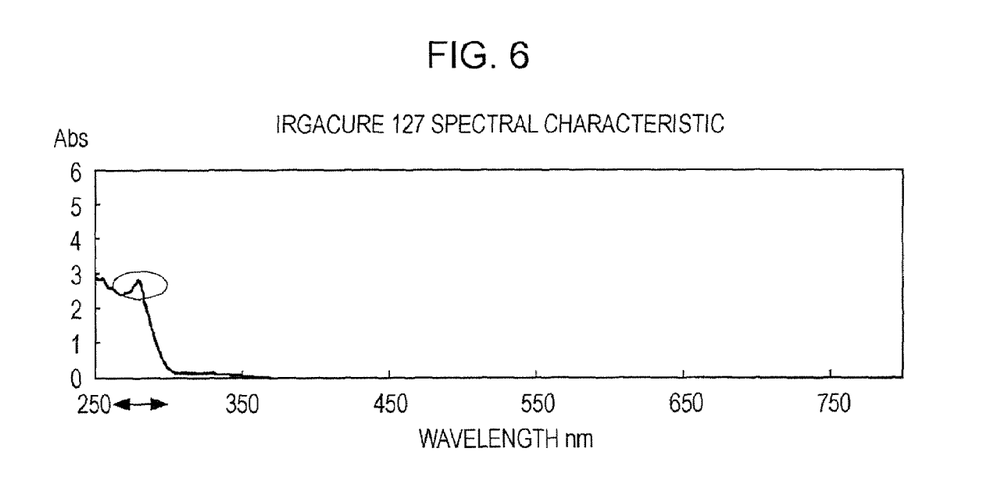
FIG. 6 is a UV-visible light absorption spectrum of a solution in allyl glycol of Initiator 1 (Irgacure 127) used in Examples.
Figure 7:
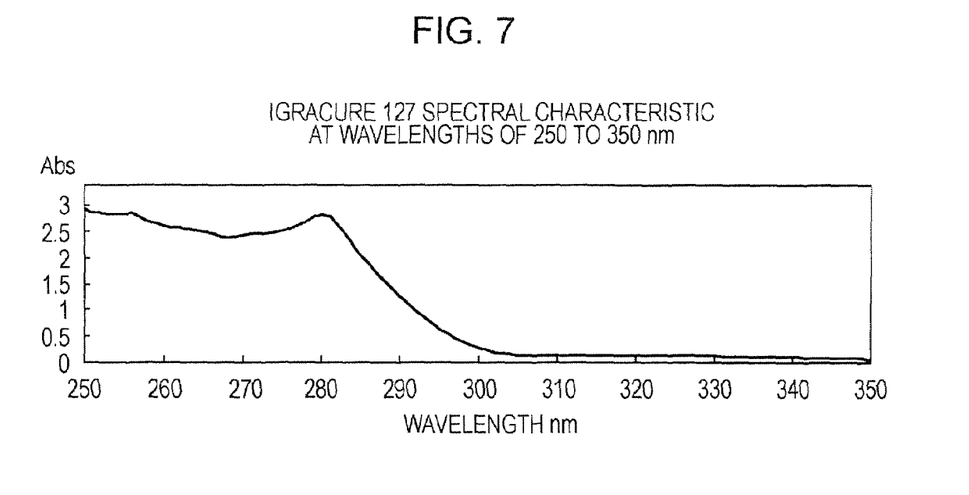
FIG. 7 is a fragmentary enlarged representation of the UV-visible light absorption spectrum shown in FIG. 6.
Figure 8:
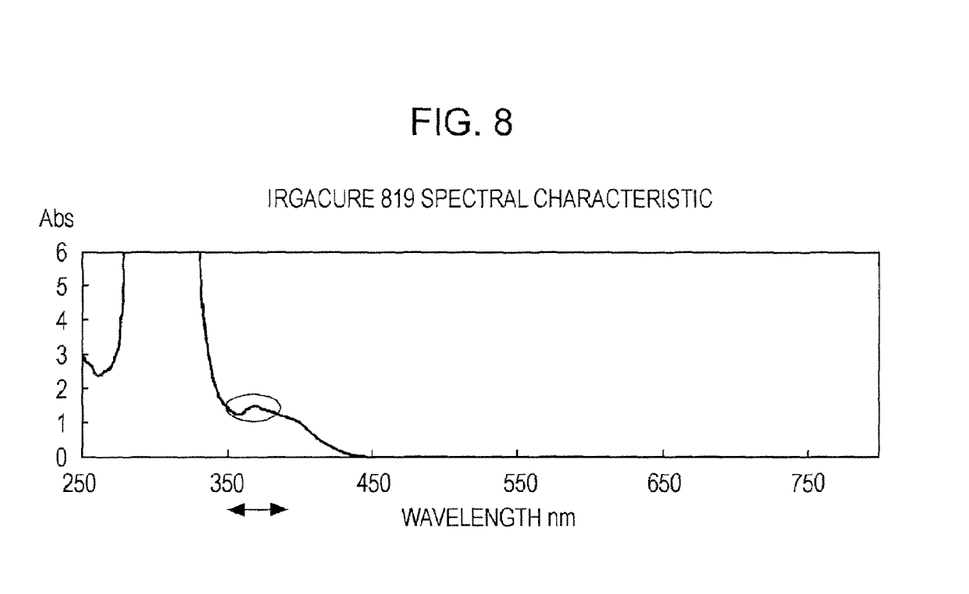
FIG. 8 is a UV-visible light absorption spectrum of a solution in allyl glycol of Initiator 2 (Irgacure 819) used in Examples.
Figure 9:
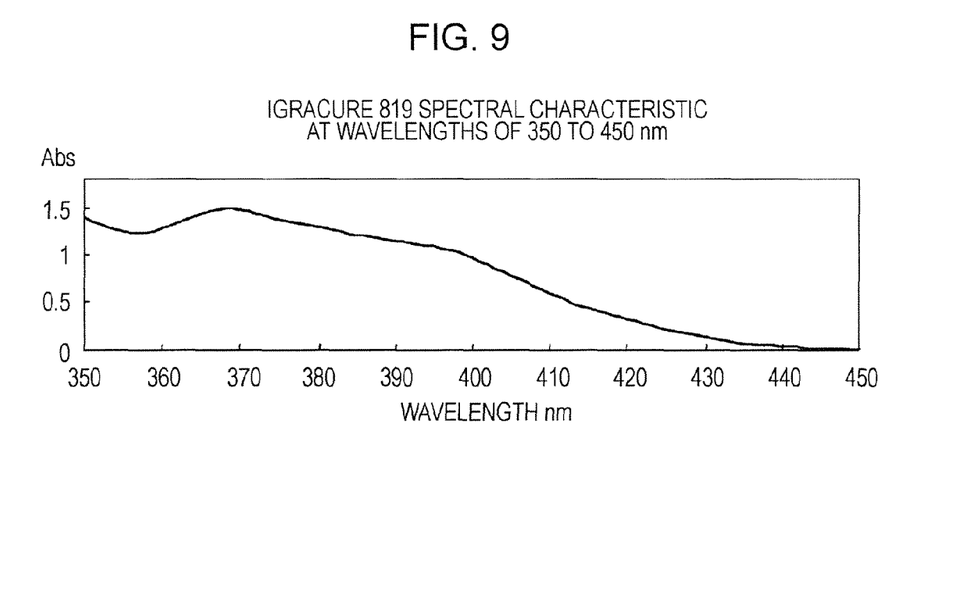
FIG. 9 is a fragmentary enlarged representation of the UV-visible light absorption spectrum shown in FIG. 8.
Figure 10:
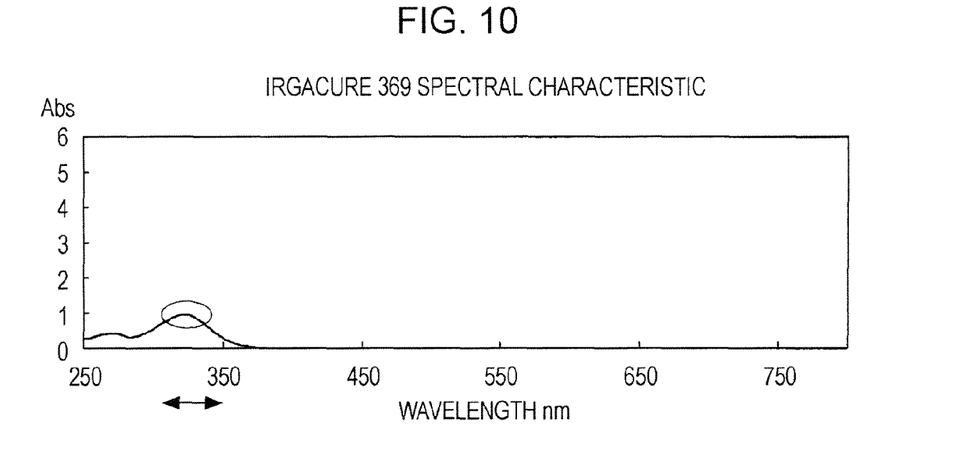
FIG. 10 is a UV-visible light absorption spectrum of a solution in allyl glycol of Initiator 3 (Irgacure 369) used in Examples.
Figure 11:
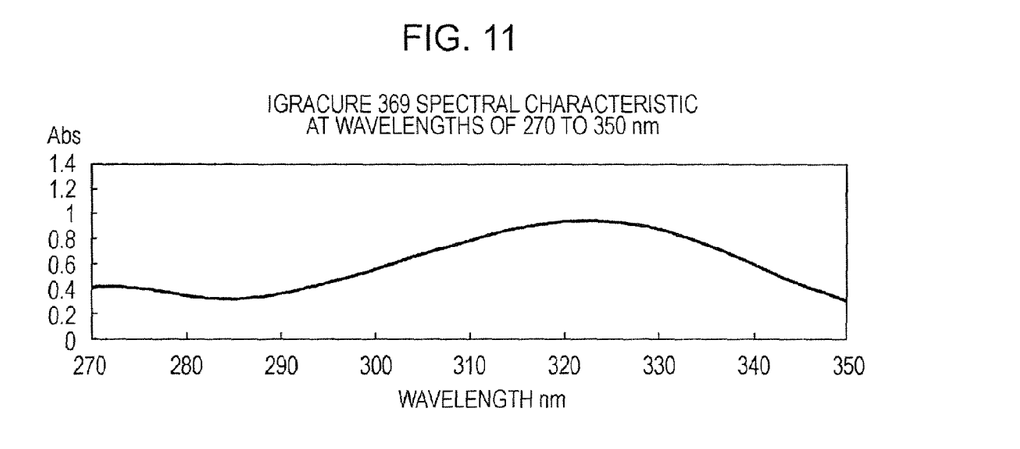
FIG. 11 is a fragmentary enlarged representation of the UV-visible light absorption spectrum shown in FIG. 10.

FIGS. 6 to 11 show UV-visible light absorption spectra of solutions in ally glycol of the initiators used in the Examples: Initiator 1 (Irgacure 127); Initiator 2 (Irgacure 819); and Initiator 3 (Irgacure 369). FIGS. 7, 9, and 11 are fragmentary enlarged representations of the UV-visible light absorption spectra shown in FIGS. 6, 8, and 10, respectively.

Initiator 1 (Irgacure 127): FIGS. 6 and 7

Concentration: 1.6 g/10000 g, Absorption peak wavelength: 275 to 300 nm

Initiator 2 (Irgacure 819): FIGS. 8 and 9

Concentration: 6.4 g/10000 g, Absorption peak wavelength: 350 to 400 nm

Initiator 3 (Irgacure 369): FIGS. 10 and 11

Concentration: 1.6 g/10000 g, Absorption peak wavelength: 300 to 350 nm

TABLE 2

| | | Example 1 C | Example 2 M | Example 3 Y | Example 4 C | Example 5 M | Example 6 Y | Comparative Example 1 C | Comparative Example 2 M | Comparative Example 3 Y |
|---|---|---|---|---|---|---|---|---|---|---|
| Ally glycol | Monomer | 75.7 | 75.7 | 75.7 | 77.7 | 77.7 | 77.7 | 75.7 | 75.7 | 75.7 |
| Biscoat #1000 | Dendritic polymer | 15 | 15 | 15 | 15 | 15 | 15 | 15 | 15 | 15 |
| Irgacure 127 | Initiator 1 | 6 | — | — | 4 | — | — | — | — | 3 |
| Irgacure 819 | Initiator 2 | — | 6 | — | — | 4 | — | — | — | 3 |
| Irgacure 369 | Initiator 3 | — | — | 6 | — | — | 4 | 6 | 6 | — |
| BYK-UV3570 | Modifier | 0.1 | 0.1 | 0.1 | 0.1 | 0.1 | 0.1 | 0.1 | 0.1 | 0.1 |
| Irgastab UV10 | Inhibitor | 0.2 | 0.2 | 0.2 | 0.2 | 0.2 | 0.2 | 0.2 | 0.2 | 0.2 |
| Pigment Blue 15:3 | Pigment | 3 | — | — | 3 | — | — | 3 | — | — |
| Pigment Violet 19 | Pigment | — | 3 | — | — | 3 | — | — | 3 | — |
| Pigment Yellow 155 | Pigment | — | — | 3 | — | — | 3 | — | — | 3 |

Curability

About 1030 thousand dots of each ink of Examples 1 to 6 and Comparative Examples 1 to 3 were ejected to 1 inch square from a printing apparatus including an ink jet head. The ejection amount of the ink was adjusted to 5 to 5.5 ng. The ink dots were exposed to light having a wavelength of 365 to 400 nm at a power of 1 to 150 mW, and light energies at which the inks were turned not sticky were compared. The results are shown in Table 3.

When a light energy of less than 250 mJ/cm$^2$ was required, the ink composition was determined to be very good; when a light energy of 250 to 350 mJ/Cm$^2$ was required, the ink composition was determined to be good; and when a light energy of more than 350 mJ/cm$^2$ was required, the ink composition was determined to be fair.

Abrasion Resistance

Rubbing test was performed for measuring abrasion resistance according to JIS K 5701, using a color fastness rubbing tester manufactured by Tester Sangyo. A load of 500 g was applied to the surface of printed matter with a shirting placed on the surface and the printed matter was rubbed. Then, separations of the cured inks were visually compared. The results are shown in Table 3.

When stain was observed on the shirting and separation did not occur from the solid portion of the ink, the abrasion resistance was determined to be very good; when some stain was observed on the shirting but separation did not occur from the solid portion of the ink, the abrasion resistance was determined to be good; when some stain on the shirting and linear separation from the solid portion were observed, the abrasion resistance was determined to be fair; and when some stain on the shirting and wide separation from the solid portion were observed, the abrasion resistance was determined to be bad.

Ink Viscosity

Measurement for viscosity was performed at 20° C. using an E-type viscometer (EMD cone-plate rotational viscometer, manufactured by Tokyo Keiki). Ink viscosities of 17 mPa·s or less result in favorable ejection. The results are shown in Table 3.

TABLE 3

| Evaluation | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Curability | Very good | Very good | Very good | Very good | Very good | Very good | Fair | Fair | Good |
| Abrasion resistance | Very good | Very good | Very good | Very good | Very good | Very good | Fair | Fair | Fair |
| Ink viscosity | 12.6 | 13.4 | 12.3 | 12.7 | 13.6 | 12.4 | 12.9 | 13.2 | 12.2 |

Examples 7 and 8, Comparative Example 4

Preparation of Active Light-Curable Ink Sets

The active light-curable ink compositions of Examples 1 to 3 were used as an ink set in an ink jet printer PM-G920 manufactured by Seiko Epson and full color image printing was performed at room temperature and normal pressure (Example 7). An A4 OHP film (XEROX FILM with no frame, manufactured by Fuji Xerox) was used as the print medium. Printing was performed under curing conditions of an integrating light energy of 300 mJ/cm$^2$, using a UV light source emitting light of 190 mW in total.

An ink set of Example 8 constituted of the active light-curable ink compositions of Examples 4 to 6 and an ink set of Comparative Example 4 constituted of the active light-curable ink compositions of Comparative Examples 1 to 3 were printed in the same manner as above.

Ink Spreading

The spreading of inks was visually compared. The results are shown in Table 4.

When no spreading was observed, the test result was determined to be very good; when small spreading was observed, the test result was determined to be good; and when wide spreading was observed, the test result was determined to be bad.

TABLE 4

|  | Example 7 | Example 8 | Comparative Example 4 |
|---|---|---|---|
| Test conditions | Constituted of compositions | Constituted of compositions | Constituted of compositions of |

TABLE 4-continued

|  | Example 7 | Example 8 | Comparative Example 4 |
|---|---|---|---|
|  | of Examples 1 to 3 | of Examples 4 to 6 | Comparative Examples 1 to 3 |
| Ink spreading | Very good | Very good | Bad |

The above results clearly show that the active light-curable ink compositions of Examples 1 to 6 according to the invention can form sufficiently cured printed images having superior abrasion resistance in comparison with the compositions of the comparative examples.

In addition, the active light-curable ink compositions of the examples according to the invention exhibited small differences in curability and abrasion resistance among colors. Accordingly, the inks of the ink sets constituted of different color active light-curable ink compositions of Examples 7 and 8 can be ejected in arbitrary order irrespective of the curability. Also, the spreading of inks at overlaps of the colors resulting from the difference of curing reactions can be reduced.

Referential Examples 1 to 6

Preparation of Active Light-Curable Ink Compositions

White ink compositions and clear ink compositions of Referential Examples 1 to 6 were prepared according to Table 5 in the same manner as in Examples 1 to 4. The values in Table 5 are represented in percent by mass.

TABLE 5

|  |  | Referential Example 1 White | Referential Example 2 Clear | Referential Example 3 (comparative) White | Referential Example 4 (comparative) Clear | Referential Example 5 (comparative) White | Referential Example 6 (comparative) Clear |
|---|---|---|---|---|---|---|---|
| Ally glycol | Monomer | 72.7 | 78.7 | 72.7 | 78.7 | 72.7 | 78.7 |
| Biscoat #1000 | Dendritic polymer | 15 | 15 | 15 | 15 | 15 | 15 |
| Irgacure 127 | Initiator 1 | — | — | 6 | 6 | — | — |
| Irgacure 819 | Initiator 2 | 6 | 6 | — | — | — | — |
| Irgacure 369 | Initiator 3 | — | — | — | — | 6 | 6 |
| BYK-UV3570 | Modifier | 0.1 | 0.1 | 0.1 | 0.1 | 0.1 | 0.1 |
| Irgastab UV10 | Inhibitor | 0.2 | 0.2 | 0.2 | 0.2 | 0.2 | 0.2 |
| Titanium oxide | Pigment | 6 | — | 6 | — | 6 | — |

Figure 12:
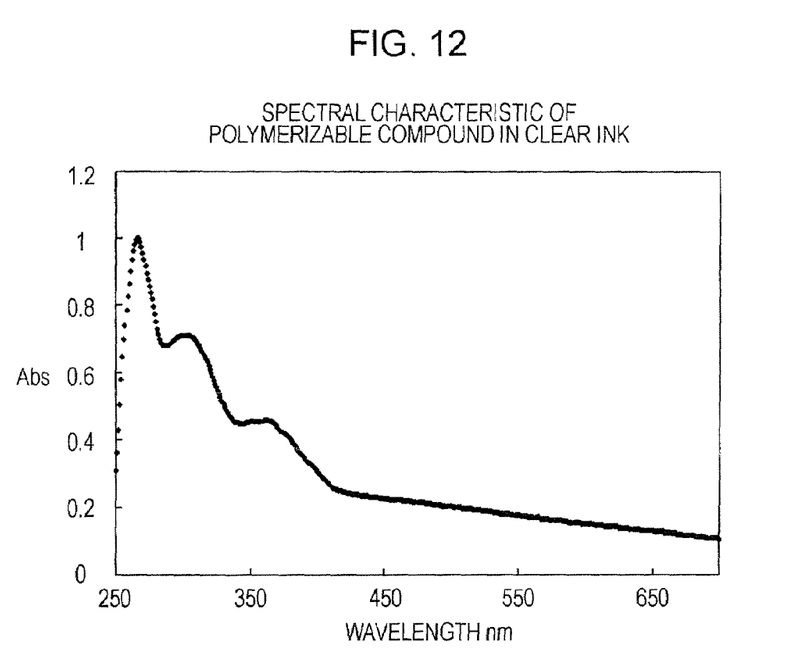
FIG. 12 is a UV-visible light absorption spectrum of a solution in allyl glycol of a polymerizable compound in a clear ink prepared in an Example.

The curabilities, the abrasion resistances, and the viscosities of the white ink compositions and clear ink compositions of Referential Examples 1 to 6 were evaluated in the same manner as in Examples 1 to 4. The results are shown in Table 6. FIG. 12 shows the UV-visible light absorption spectrum of a solution of the polymerizable compounds (allyl glycol and Biscoat #1000) of the clear ink compositions.

TABLE 6

| Evaluation | Referential Example 1 | Referential Example 2 | Referential Example 3 (Comparative) | Referential Example 4 (Comparative) | Referential Example 5 (Comparative) | Referential Example 6 (Comparative) |
|---|---|---|---|---|---|---|
| Curability | Very good | Very good | Fair | Fair | Fair | Good |
| Abrasion resistance | Very good | Very good | Fair | Fair | Fair | Fair |
| Ink viscosity | 14.5 | 13.4 | 14.3 | 12.9 | 14.9 | 12.4 |

In the ink sets constituted of the active light-curable ink compositions of Examples 1 to 3 and Referential Examples 1 and 2 and the ink set constituted of the active light-curable ink compositions of Examples 4 to 6 and Referential Examples 1 and 2, the differences in curability and abrasion resistance among the colors are reduced. Accordingly, the inks of the ink set can be ejected in an arbitrary order irrespective of the curability, and the spreading of the inks at overlaps of the inks, resulting from the difference of curing reactions, can be reduced.

What is claimed is:

1. An ink set comprising a plurality of active light-curable ink compositions, including:
   a yellow ink composition comprising a yellow color material having an absorption peak in a wavelength region of 370 to 390 nm, a polymerizable compound and a polymerization initiator having an absorption peak in a different wavelength region from the yellow color material, the polymerization initiator for the yellow ink composition comprising isoamino-P-dimethylaminobenzoate ester, α-aminoalkylphenone, oxime ester, or aminobenzoate, wherein when the absorbance of the absorption peak of the yellow color material is defined to be 1, the absorption peak of the polymerization initiator of the yellow ink composition lies in a wavelength region where the yellow color material exhibits an absorbance of 0.6 or less;
   a magenta ink composition comprising a magenta color material having an absorption peak in a wavelength region of 550 to 570 nm, a polymerizable compound and a polymerization initiator having an absorption peak in a different wavelength region from the magenta color material, the polymerization initiator for the magenta ink composition comprising thioxanthone,
   wherein when the absorbance of the absorption peak of the magenta color material is defined to be 1, the absorption peak of the polymerization initiator of the magenta ink composition lies in a wavelength region where the magenta color material exhibits an absorbance of 0.5 or less; and
   a cyan ink composition comprising a cyan color material having an absorption peak in a wavelength region of 330 to 350 nm, a polymerizable compound and a polymerization initiator having an absorption peak in a different wavelength region from the cyan color material, the polymerization initiator for the cyan ink composition comprising α-hydroxyalkylphenone or anthraquinone, wherein when the absorbance of the absorption peak of the cyan color material is defined to be 1, the absorption peak of the polymerization initiator of the cyan ink composition lies in a wavelength region where the cyan color material exhibits an absorbance of 0.6 or less.

2. The ink set according to claim 1, further comprising
   (d) an active light-curable white ink composition containing a polymerizable compound, a white material having an absorption peak in a wavelength region, and a polymerization initiator having an absorption peak in the wavelength region where the white color material has the absorption peak.

3. The ink set according to claim 2, wherein the polymerization initiator of the white ink composition has an absorption peak in the wavelength region where the white material exhibits an absorbance higher than the absorbance in the UV-visible region of 300 to 350 nm.

4. The ink set according to claim 2, wherein the polymerization initiator in the active light-curable white ink composition has an absorption peak in the wavelength region of 350 to 450 nm.

5. The ink set according to claim 1, further comprising:
   (e) an active light-curable clear ink composition containing at least one polymerizable compound and a polymerization initiator, but not containing a color material, wherein the polymerization initiator of the active light-curable clear ink composition has an absorption peak in a wavelength region different from the wavelength region where the highest absorption peak of the at least one polymerizable compound of the active light-curable clear ink composition lies.

6. An ink jet printing apparatus comprising the ink set of claim 1.

7. An ink jet recording method comprising providing the ink set as set forth in claim 1, ejecting droplets of each of the plurality of active light-curable ink compositions onto a recording medium and irradiating the ejected ink compositions with active light.

8. An ink set comprising a plurality of active light-curable ink compositions, including:
   a yellow ink composition comprising a yellow color material having an absorption peak in a wavelength region of 370 to 390 nm, a polymerizable compound and a polymerization initiator having an absorption peak in a different wavelength region from the yellow color material, the polymerization initiator for the yellow ink composition comprising isoamino-P-dimethylaminobenzoate ester, α-aminoalkylphenone, oxime ester, or aminobenzoate wherein the polymerization initiator of the yellow ink composition has an absorption peak in a wavelength region of 300 to 350 nm;
   a magenta ink composition comprising a magenta color material having an absorption peak in a wavelength region of 550 to 570 nm, a polymerizable compound and a polymerization initiator having an absorption peak in a different wavelength region from the magenta color material, the polymerization initiator for the magenta ink composition comprising thioxanthone, wherein the polymerization initiator of the magenta ink composition has an absorption peak in a wavelength region of 350 to 450 nm; and a cyan ink composition comprising a cyan color material having an absorption peak in a wavelength region of 330 to 350 nm, a polymerizable compound and a polymerization initiator having an absorption peak in a different wavelength region from the cyan color material, the polymerization initiator for the cyan ink composition comprising α-hydroxyalkylphenone or anthraquinone, wherein the polymerization initiator of the cyan ink composition has an absorption peak in a wavelength region of 275 to 300 nm.

9. The ink set according to claim 8, further comprising
(f) an active light-curable white ink composition containing a polymerizable compound, a white material having an absorption peak in a wavelength region, and a polymerization initiator having an absorption peak in the wavelength region where the white color material has the absorption peak.

10. The ink set according to claim 9, wherein the polymerization initiator of the white ink composition has an absorption peak in the wavelength region where the white material exhibits an absorbance higher than the absorbance in the UV-visible region of 300 to 350 nm.

11. The ink set according to claim 9, wherein the polymerization initiator in the active light-curable white ink composition has an absorption peak in the wavelength region of 350 to 450 nm.

12. The ink set according to claim 8, further comprising:
(g) an active light-curable clear ink composition containing at least one polymerizable compound and a polymerization initiator, but not containing a color material, wherein the polymerization initiator of the active light-curable clear ink composition has an absorption peak in a wavelength region different from the wavelength region where the highest absorption peak of the at least one polymerizable compound of the active light-curable clear ink composition lies.

13. An ink jet printing apparatus comprising the ink set of claim 8.

14. An ink jet recording method comprising providing the ink set as set forth in claim 8, ejecting droplets of each of the plurality of active light-curable ink compositions onto a recording medium and irradiating the ejected ink compositions with active light.

15. The ink set according to claim 1, wherein the polymerization initiator for the yellow ink composition consists of isoamino-P-dimethylaminobenzoate ester, α-aminoalkylphenone, oxime ester, or aminobenzoate, the polymerization initiator for the magenta ink composition consists of thioxanthone and the polymerization initiator for the cyan ink composition consists of α-hydroxyalkylphenone or anthraquinone.

* * * * *